May 17, 1949.
C. N. HOYLER ET AL
2,470,311
ROTARY CONVEYER
Filed April 16, 1943
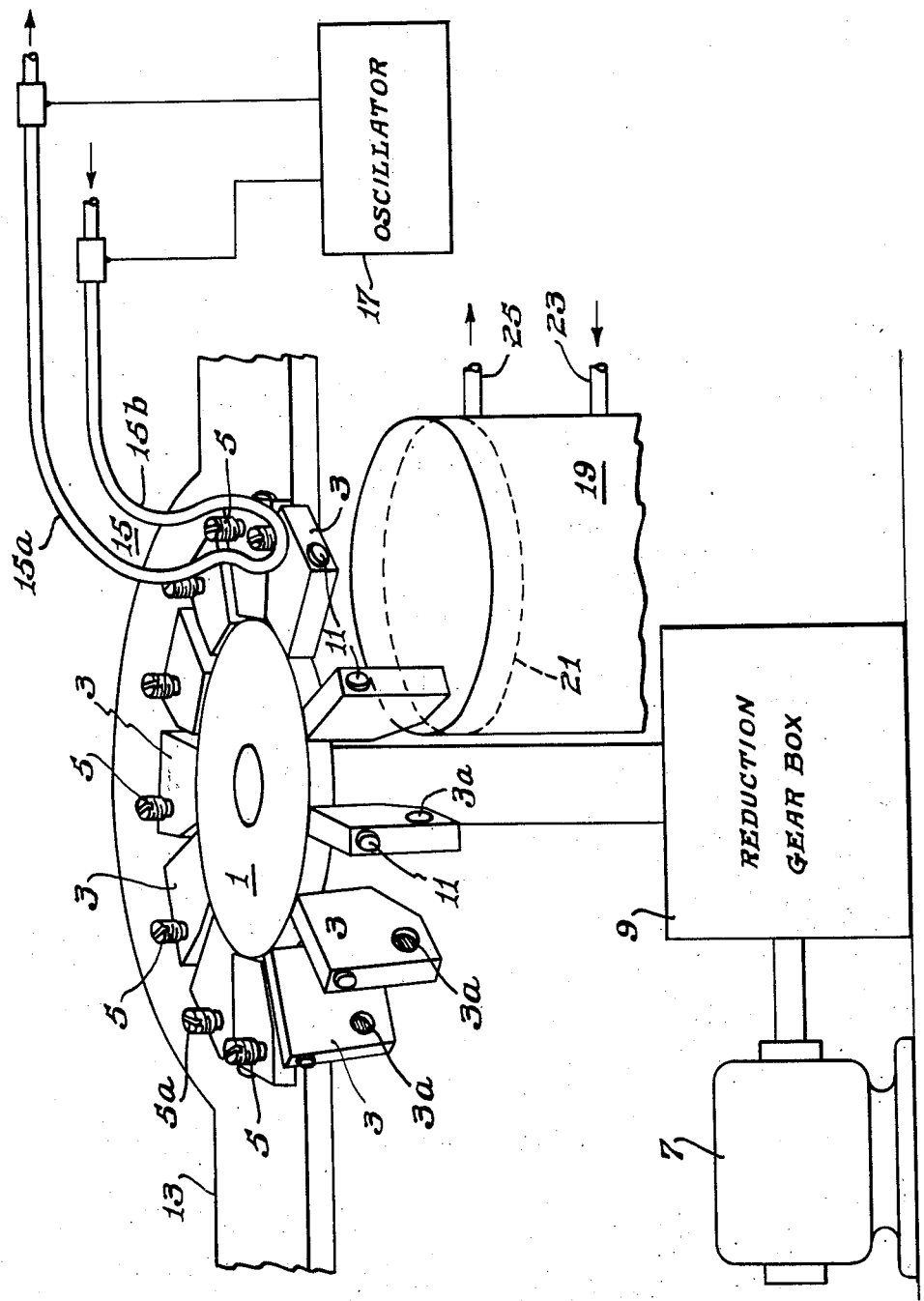
Inventors
Cyril N. Hoyler,
Rudolph A. Bierwirth
By
Attorney Patented May 17, 1949

2,470,311

UNITED STATES PATENT OFFICE 2,470,311

ROTARY CONVEYER

Cyril N. Hoyler, Princeton, and Rudolph A. Bierwirth, Kingston, N. J., assignors to Radio Corporation of America, a corporation of Delaware Application April 16, 1943, Serial No. 483,258

1 Claim. (Cl. 198—209)

The invention relates to apparatus for altering the molecular structure of metal objects as by heating the metal, or a part thereof, and subsequently abstracting the heat.

The principal object of the present invention is to provide a reliable and trouble-free apparatus for the mass production of metal objects of the type required to be hardened, tempered, carbonized or annealed at some stage in their manufacture.

Another object of the present invention is to provide an automatic or semi-automatic heat treating machine characterized by the simplicity and economy of its parts and one incorporating a high frequency induction heater of novel form and construction.

Another and important object of the present invention is to provide an improved apparatus of the general character described and one which lends itself readily to the creation of localized changes in the molecular structure of small metal objects such, for example, as screws, bolts, valve parts, and other machine elements.

A further and specific object is to provide an improved means for and method of applying power for heating a portion of an object which is to be hardened in a localized region and for quenching the object so quickly that the generated heat is not permitted to flow throughout the object whereby the localized part only is hardened.

While the invention will be described as applied to the hardening of the kerf or slotted end of a steel set-screw it is to be understood that the disclosure in this respect is merely illustrative for purposes of explaining the inventive concept and that the invention is also applicable to the heat treatment of other ferrous and non-ferrous metal objects of various sizes and shapes.

In the accompanying partly diagrammatic perspective view of an apparatus within the invention, there is shown an endless conveyor comprising a turntable 1 which is provided about its periphery with a series of pivotally mounted holders 3 for the screws 5 or other metal articles to be treated. This turntable is adapted to be rotated in a clockwise direction and at a desired rate by any convenient drive mechanism, here exemplified by the electric motor 7 and gear box 9. In the instant case, the holders 3 are each provided with a recess 3a within which the articles 5 are adapted to be seated with the part to be treated (in this case the slotted ends 5a of the screws 5) protruding beyond the surface of its support. The holders 3, are constituted of a heat resistant insulating material (e. g., asbestos composition) and comprise substantially rectangular slabs which are supported off-center on separate radially extending arms or pivots 11 with which the turntable 1 is provided. A stationary platform or base 13 which partly surrounds the turntable 1 serves to maintain the object holders 3 in a horizontal plane throughout only a portion of their endless, circular path. Since the object holders are mounted off-center on the pivots 11 it is apparent that when the trailing edges of the said holders have passed beyond the edge of the base 13 they will swing downwardly, under the influence of gravity, so that their major faces extend in the vertical direction. It is likewise apparent that when the object holders 3 again encounter the edge of the base 13 they will be urged upwardly and returned to the horizontal position whereat the screws 5 or other articles to be treated are started upon their journey by placing them in the recesses 3a with which the holders 3 are provided.

As the turntable 1 rotates, the articles 5 are presented in sequence to a magnetic field supplied by an applicator or induction coil 15 which is connected to a suitable source of high frequency energy, exemplified by the radio frequency oscillation generator 17. The induction heating element or applicator 15 preferably comprises a hollow conductor having a pair of oppositely located arms 15a, 15b, through which a cooling fluid may be circulated, and which extend a limited distance around the path of the articles 5 in line with the portion thereof (i. e., the slotted end 5a) to be heated. As shown in the drawing, the inner ends of the arms 15a, 15b are bent upwardly to permit the articles 5 to be entered therebetween. The power delivered by the oscillator 17 to the applicator 15 is so adjusted that the magnetic field about the applicator is of an intensity calculated to heat the articles 5 in a predetermined time to prevent undesired heat flow, to a temperature sufficient to effect the desired molecular alteration in the metal of which the said articles are constituted. In the instant case the rapidity with which the articles are heated is determined by so shaping the applicator 5 and so regulating the turntable speed that the articles are carried through the region of maximum intensity of the magnetic field in the required time.

As shown in the drawing, while the articles 5 are being heated by the magnetic field about the applicator 15 the holders 3 on which the said articles are carried are maintained in a horizontal plane by the stationary platform or base 13 upon which they move. The edge of this base lies adjacent to the point whereat the articles 5 attain the desired critical temperature and beneath this point is located a receptacle or tank 19 through which a cooling medium 21 is circulated as by means of inlet and outlet pipes 23 and 25, respectively. Thus, as the holders 3 are driven in succession beyond the edge of the base 13 their trailing edges will swing downwardly and the metal articles 5 thereon will be plunged into the cooling bath 21.

It will be appreciated by those skilled in the art to which this invention appertains that the critical temperature to which the articles are heated, and the type and temperature of the cooling medium should be chosen with a careful regard to the kind and dimensions of the metal articles and the nature of the molecular change desired. Since such data is available in numerous standard books on metallurgy it would needlessly burden the record to repeat it here. Suffice it to say that if the now hardened steel articles 5 are to be tempered the above described process may be repeated at a lower temperature than that employed in the hardening process.

Various other applications and modifications of the invention will suggest themselves to those skilled in the art. Accordingly, the foregoing description of one preferred embodiment of the invention should be interpreted as illustrative and not in a limiting sense except as required by the prior art and by the spirit of the appended claim.

What is claimed is:

Apparatus of the character described comprising a stationary horizontal platform, a plurality of object holders pivotedly mounted in spaced relation for movement in a horizontal plane upon said platform and in a return path which extends beyond an edge of said platform, means for moving said holders beyond said edge of said platform whereby said holders are free to be swung downwardly on their pivots and caused to discharge any objects thereon and, upon continuation of said movement in said path, are returned to their said horizontal position upon said platform.

CYRIL N. HOYLER.
RUDOLPH A. BIERWIRTH.

REFERENCES CITED

The following references are of record in the file of this patent:

UNITED STATES PATENTS

| Number | Name | Date |
|---|---|---|
| Re. 22,322 | Goodridge | May 25, 1943 |
| 313,698 | Weaver | Mar. 10, 1885 |
| 760,524 | Crossley | May 24, 1904 |
| 777,728 | Haskins | Dec. 20, 1904 |
| 1,263,485 | Thornburg | Apr. 23, 1918 |
| 1,350,697 | Bock | Aug. 24, 1920 |
| 2,202,758 | Denneen et al. | May 28, 1940 |
| 2,299,934 | Sherman et al. | Oct. 27, 1942 |
| 2,336,177 | Howard et al. | Dec. 7, 1943 |

FOREIGN PATENTS

| Number | Country | Date |
|---|---|---|
| 272,849 | Germany | Apr. 11, 1914 |
| 363,323 | Great Britain | June 10, 1930 |